J. M. GWINN, Jr.
GROUND SPEED INDICATOR.
APPLICATION FILED NOV. 20, 1917.
1,298,494. Patented Mar. 25, 1919.
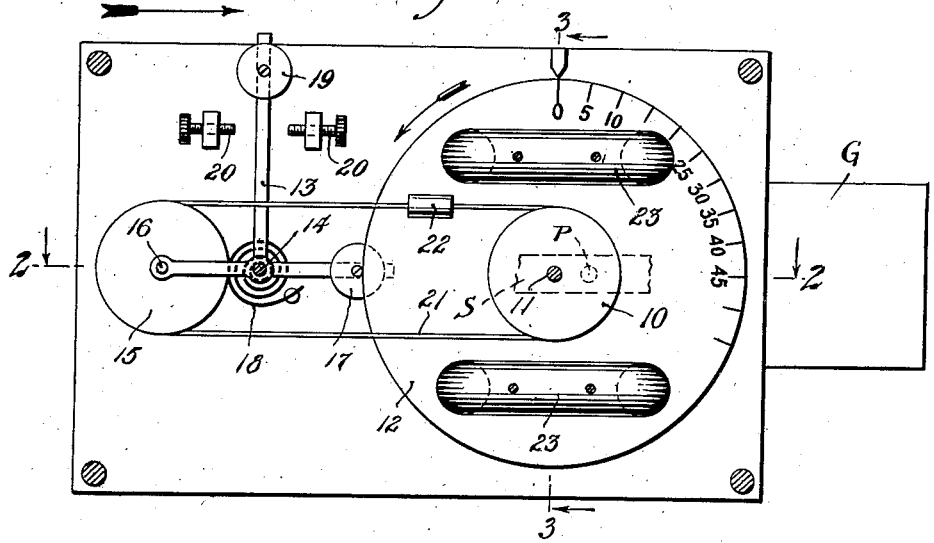
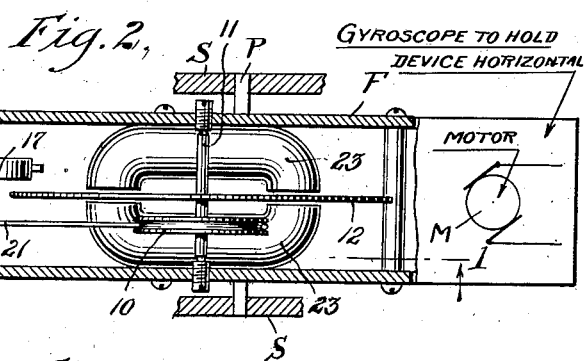
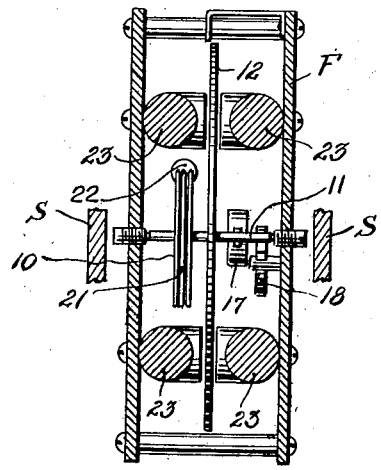
WITNESSES
INVENTOR
J. M. GWINN, JR.
BY
ATTORNEYS

UNITED STATES PATENT OFFICE.

JOSEPH MARR GWINN, JR., OF NEW ORLEANS, LOUISIANA.

GROUND-SPEED INDICATOR.

1,298,494.     Specification of Letters Patent.     Patented Mar. 25, 1919.

Application filed November 20, 1917. Serial No. 202,969.

*To all whom it may concern:*

Be it known that I, JOSEPH MARR GWINN, Jr., a citizen of the United States, and a resident of New Orleans, in the parish of Orleans and State of Louisiana, have invented a new and Improved Ground-Speed Indicator, of which the following is a full, clear, and exact description.

This invention relates to instruments of precision and has particular reference to means for automatically indicating the rate of speed of any carrier or other object with respect to the ground or surface of the earth.

More definitely stated the primary object of this invention is to provide an instrument whereby the actual speed of an aeroplane may be determined and observed at any time irrespective of the direction or speed of air currents or other conditions which would tend to confuse or disturb the operation of any speed indicating devices depending upon the speed of the machine with respect to the supporting medium or upon the behavior of the motive means which might be used.

In my experience as an aviator I have observed that one of the most serious problems of the air-man who would discharge or deliver a bomb or other object for the purpose of striking a target or other object on the surface of the earth, is to determine the actual speed of the carrier or aeroplane with respect to the earth, or what is commonly known in aviation as the ground speed. In connection with existing instruments which are capable of indicating with substantial reliability the altitude, if the machine is equipped with a device such as disclosed herein for the purpose of indicating the ground speed, it is a relatively simple matter of calculation to determine the trajectory that the missile will describe between the moment of leaving the aeroplane or other carrier and the striking of the target.

While I refer with particularity herein to the utility of this device in connection with air craft for the delivery of bombs in the conduct of military pursuits, still I would have it understood that the device is capable of much broader adaptability and may be used in various arts in times of peace as well as in war. I wish it to be understood also that the mechanical and physical principles relied upon in the practice of this invention are capable of a much broader interpretation than may be indicated in the accompanying illustrations and specific description thereof, and hence in the interpretation of the claims made herein I mean to have the benefit of such interpretation or definition of terms as will be justified by the state of the art. In other words believing as I do that an automatic instrument for indicating automatically the absolute speed of the carrier is new, I do not desire, nor intend to be unnecessarily restricted to any particular instrumentalities for carrying out the principles and advantages herein enunciated or referred to. For an indication, however, of a type of means which I believe to be the best suited for the purposes of this specification, reference is now made to the accompanying drawings in which—

Figure 1 is a side elevation, somewhat diagrammatic, but indicating the principal features of my improvement in operative position but with the movable parts in neutral position.

Fig. 2 is a horizontal section on the line 2—2 of Fig. 1; and

Fig. 3 is a vertical transverse section on the line 3—3 of Fig. 1.

Referring now more particularly to the drawings I indicate at 10 a pulley or other wheel supported for rotation around a horizontal axis 11, and connected to this wheel 10 is a disk 12 also mounted for rotation around the same axis. Any suitable means may be provided such, for example, as a gyroscope for the purpose of maintaining the instrument as a whole on a proper level. The gyroscope is shown diagrammatically at G. It may be driven in any suitable manner as by a motor M. The gyroscope G may be secured to the frame F and the latter may be pivoted at P on supports S, the pivotal points being preferably on an axis to the center of gravity of the device. At 13 I indicate a bell crank journaled and supported upon a horizontal axis 14 in the same horizontal plane as the axis 11. A wheel 15, preferably of the same size and character as the wheel 10, is journaled for rotation around an axis 16 upon one arm of the bell crank, while diametrically opposite the wheel 15 is a counter-balance weight 17 calculated to substantially counter-balance the weight of the wheel 15 and parts supported thereon.

Within certain predetermined limits the bell crank 13 is adapted to rotate around the horizontal axis 14, but I provide a means such as a spring 18 tending to hold the bell crank from such rotation or in neutral position as indicated in Fig. 1, one end of the spring being connected to the bell crank and the other end being fixed to some stationary part of the instrument. Under these conditions the normal position of the axis 16 lies in the same plane as the axes 11 and 14. To one upwardly projecting arm of the bell crank 13 is connected a weight 19, and the displacement of this weighted arm in either direction from the vertical is limited by an adjustable stop 20.

At 21 I indicate an endless belt or chain of any suitable character operating over the peripheries of the wheels 10 and 15. Under the normal conditions above recited both straight portions of the belt between the wheels are adapted to be normally substantially horizontal, and to one of these portions or runs of the belt is fixed a weight 22, the belt constituting the only immediate support for the weight. The device is so calculated that the weight 22 is adapted for forward or rearward displacement toward either wheel 10 or 15 within the limits determined by the means acting upon the disk 12, or its equivalent, tending to limit such displacement.

The attention of the reader is now called to the index disk 12, which though described as a disk is to be understood as being capable of assuming various specific forms, but intended to serve two main functions as follows: First, the periphery of the disk is provided with suitable graduation marks preferably from zero up to or beyond the maximum and may represent, for example, rates of ground speed of any suitable units of space per any suitable units of time. Obviously, therefore, it follows that if the weight 22 be displaced rearwardly, for example, toward the wheel 15 the disk will be correspondingly rotated through a certain angle by reason of the operation of the belt 21 and wheel 10 over which it operates. Likewise a forward displacement of the weight 22 will cause a corresponding reverse angular displacement of the indicator. The second important function for the disk 12 is to serve as one element of a retarding means or brake, as by virtue of eddy currents passing therethrough from pairs of magnets 23 suitably arranged in proximity to the disk.

Assuming now for a brief statement of the operation of the instrument that the carrier or aeroplane is to be given an acceleration toward the right or in the direction of the large arrow on Fig. 1, the weight 22, by its inertia of rest or relative rest is subject to a force of acceleration relatively toward the wheel 15 proportional to the acceleration given to the machine. This produces a torque on the wheel 10 and therefore on the disk 12 proportional to the same acceleration. The disk 12 is retarded by virtue of the magnets by a torque proportional to its angular velocity. Therefore, the disk 12 will turn (neglecting friction of the moving parts and inertia of the disk) with a speed proportional to the acceleration of the machine or carrier. Since this rotation of the disk is directly readable at its periphery the observer or operator will always know at any moment the absolute rate of speed at which he is traveling over the surface of the earth. The effect of inertia of the disk serves merely to make the mechanism lag slightly during the acceleration, but this effect is neutralized by the effect of the inertia of motion of the same parts after the initial acceleration. Since the speed of the disk 12 is proportional to the acceleration, the angle through which the disk turns, speed multiplied by time, is proportional to the velocity, acceleration multiplied by time, of the machine or carrier of the instrument. Since, however, the time is constant or a known quantity its elimination from the proportion gives a result that the rotation of the disk is proportional or corresponds to the speed possessed by the carrier. It is to be noted furthermore that this result is in no wise dependent upon or affected by any condition of movement or rest of the medium supporting the carrier.

The element of friction incident to the movable parts is of greater consequence, but is overcome in the first place by mounting the rotating parts in bearings as nearly frictionless as possible and still without rendering the instrument too delicate to be serviceable, and also by the peculiar manner of supporting the wheel 15 to which reference is now again made. Since the normal position of the bell crank is such that the run of the belt to which the weight 22 is connected is maintained normally precisely level, the first effect of the acceleration acting upon the weight 22 to displace it, as for instance rearwardly toward the wheel 15, will have an immediate and superior effect upon the weight 19 supported upon an arm of the bell crank considerably longer than the radius of either wheel 10 or 15, to cause the weight 19 to swing rearwardly until it is stopped by one of the adjustable screws at 20. This swing of the bell crank around its axis 14 carries the axis 16 of the wheel 15 below the normal level thereby causing the belt to assume a downwardly inclined position. This upward or downward displacement of the axis 16 as it swings around the axis 14 is never more than two or three degrees and hence not sufficient to disturb the tension of the belt, but it is sufficient to impart to the weight 22 an advantage so that its movement or acceleration due to the acceleration of the carrier is augmented by the inclination of its path just enough to neutralize the effect of friction pertinent to the movable parts. By the lowering of the axis of the pulley 15 the tendency of the weight 22 to move relatively is augmented by the introduction of the component of gravity, which as before stated is calculated in the construction and operation of the instrument to neutralize the effect of friction. The spring 18 holds the weight 19 in neutral position when not accelerated, and also controls the sensitiveness of the weight 19.

I claim:

1. In a device for indicating the speed of an aeroplane or the like, a pair of rotatable supports, an endless belt carried by said rotatable supports, a weight carried by said endless belt, the inertia of said weight due to the acceleration of the aeroplane serving to displace the same toward or away from said rotatable support, and an index operatively connected with one of said supports for indicating the extent of such displacement and the corresponding velocity of the aeroplane.

2. In a speed indicator, a pair of rotatable supports, an endless belt carried by said supports, a weight carried by said endless belt, the inertia of the weight due to acceleration of the supports tending to displace the weight toward or away from said supports, an index connected with one of said supports for indicating said displacement, and means for compensating for the frictional resistance of said supports.

3. In a speed indicator, the combination of a pair of rotatable supports, an endless belt carried by said supports, a weight carried by said endless belt and adapted to be displaced toward or away from said supports when the latter are accelerated, an index connected with one of said supports for indicating such displacement, means for compensating for the frictional resistance of said supports, and means for maintaining the belt in a normally horizontal position.

4. In a ground speed indicator for aeroplanes or the like, the combination of an index disk, a wheel connected to and coaxial with the disk, another wheel in the same vertical plane as the aforesaid wheel and mounted for rotation around an axis in the same horizontal plane as the axis of the other wheel and disk, a flexible member extending from one wheel to the other, and a weight connected to and supported upon the flexible member and displaceable rearwardly as a result of forward acceleration of the aeroplane, such rearward relative movement of the weight being communicated through the flexible member and first mentioned wheel to the index disk where the measurement of such displacement and corresponding aeroplane speed is readable.

5. In a ground speed indicator for aeroplanes or other carriers, the combination of a movable index member, means acting upon said member to resist such movement, a pair of wheels mounted in the same vertical plane, connections between one of said wheels and the index member, a belt operating over both wheels with one run thereof in a horizontal plane, a weight connected to said run of the belt and movable as a result of the acceleration given to the carrier and in proportion to the velocity thereof, the extent of such relative movement and velocity being measured by the index member, and means acting upon the belt to automatically neutralize the effect of friction incident to the movable parts.

6. In a device of the character set forth, the combination of a weight, means to support said weight for free relative displacement rearwardly or forwardly in a direction parallel with the direction of movement of the vehicle, means to indicate to the observer the extent of such displacement and the corresponding velocity of the aeroplane, and means for compensating for the frictional resistance of the said supporting means.

7. In a device of the character set forth, the combination of a weight, means to support said weight for free relative displacement rearwardly or forwardly in a direction parallel with the direction of movement of the vehicle, means to indicate to the observer the extent of such displacement and the corresponding velocity of the aeroplane, means for compensating for the frictional resistance of the said supporting means, and means for maintaining the device in a horizontal position.

JOSEPH MARR GWINN, Jr.